US012479207B2

(12) United States Patent
Kawamata et al.

(10) Patent No.: US 12,479,207 B2
(45) Date of Patent: Nov. 25, 2025

(54) INKJET RECORDING APPARATUS

(71) Applicant: KYOCERA Document Solutions Inc., Osaka (JP)

(72) Inventors: Shuhei Kawamata, Osaka (JP); Yasutaka Inui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 142 days.

(21) Appl. No.: 18/523,817

(22) Filed: Nov. 29, 2023

(65) Prior Publication Data

US 2024/0173979 A1 May 30, 2024

(30) Foreign Application Priority Data

Nov. 30, 2022 (JP) ................................ 2022-191161

(51) Int. Cl.
*B41J 2/165* (2006.01)
*B41J 25/304* (2006.01)

(52) U.S. Cl.
CPC ....... *B41J 2/16538* (2013.01); *B41J 2/16508* (2013.01); *B41J 2/16535* (2013.01); *B41J 2/16541* (2013.01); *B41J 2/16544* (2013.01); *B41J 2/16547* (2013.01); *B41J 2/16552* (2013.01); *B41J 2/16585* (2013.01); *B41J 25/304* (2013.01)

(58) Field of Classification Search
CPC ......................... B41J 2/16538; B41J 2/16541; B41J 2/16547; B41J 25/304; B41J 2/16508; B41J 2/16544; B41J 2/16552; B41J 2/16585; B41J 2/16535
See application file for complete search history.

(56) References Cited

U.S. PATENT DOCUMENTS

2007/0188545 A1* 8/2007 Miyamoto ........... B41J 2/16585 347/33
2018/0207936 A1 7/2018 Satake et al.
2020/0247128 A1 8/2020 Tanaka

FOREIGN PATENT DOCUMENTS

AU 2017248418 A1 10/2018
JP 2000190512 A * 7/2000 ............. B41J 2/165
JP 2018134824 A 8/2018
JP 2018154088 A 10/2018
JP 2020121527 A 8/2020

* cited by examiner

*Primary Examiner* — Yaovi M Ameh

(74) *Attorney, Agent, or Firm* — Studebaker Brackett PLLC

(57) ABSTRACT

An inkjet recording apparatus includes a holder, a blade and a biasing member. The holder faces a nozzle surface of an inkjet head and moves in a predetermined traveling direction along the nozzle surface. The blade is provided in the holder and swung about a shaft crossing the traveling direction. The biasing member is provided in the holder and biasing the blade in a direction in which a tip end portion of the blade is pressed against the nozzle surface.

6 Claims, 16 Drawing Sheets

INKJET RECORDING APPARATUS

INCORPORATION BY REFERENCE

This application is based on and claims the benefit of priority from Japanese patent application No. 2022-191161 filed on Nov. 30, 2022, which is incorporated by reference in its entirety.

BACKGROUND

The present disclosure relates to an inkjet recording apparatus.

In an inkjet recording apparatus, it is conceivable that water evaporates from ink in the nozzles of the inkjet head during a period when an image forming job is not being performed, and the nozzles become clogged due to an increase in the viscosity of the ink. To prevent the clogging, a purge treatment in which the ink in the nozzle is purged into the cap is performed. However, if the ink remaining on the nozzle surface is left, there is a problem that the ink drops on the sheet or sticks to the nozzle surface during the image forming job. Therefore, a technology to remove the ink remaining on the nozzle surface is being studied. For example, there is a configuration in which the ink adhering to the nozzle surface is removed by sliding a blade in contact with the nozzle surface in a predetermined direction.

By the way, the nozzle surface is covered with a water-repellent film excellent in water repellency, but if the load applied to the nozzle surface by the blade is excessive, the water-repellent film is scraped off, so it is necessary to optimize the load of the blade. In the past, however, since the load is applied by the deflection of the blade, the range in which the load could be adjusted is narrow. In addition, when the inkjet recording apparatus includes multiple inkjet heads, it includes the same number of blades as the inkjet head, but it is difficult to apply equal loads to all the blades because of dimensional and assembly errors of the members and variations in positioning accuracy during lifting and lowering.

In response to this problem, in the case of a configuration in which multiple blades are fixed to the rotational shaft and the angle of the multiple blades is adjusted collectively by the gear, it is not possible to adjust the angle according to each of the inkjet heads. It also requires gear control, which complicates the configuration. In addition, in the configuration in which the swingably supported blade is pressed against the nozzle surface by a spring, the problem of the conventional configuration depending on the deflection of the blade is not solved because the blade is deformed by limiting the swinging beyond a predetermined range of the blade. In addition, if the angle of the blade is changed by shifting the position of the support shaft of the blade, the angle of the blade may become unstable because the support shaft is not fixed.

SUMMARY

An inkjet recording apparatus according to the present disclosure includes a holder, a blade and a biasing member. The holder faces a nozzle surface of an inkjet head and moves in a predetermined traveling direction along the nozzle surface. The blade is provided in the holder and swung about a shaft crossing the traveling direction. The biasing member is provided in the holder and biasing the blade in a direction in which a tip end portion of the blade is pressed against the nozzle surface.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an inkjet recording apparatus 1 according to one embodiment of the present disclosure will be described.

Figure 1:
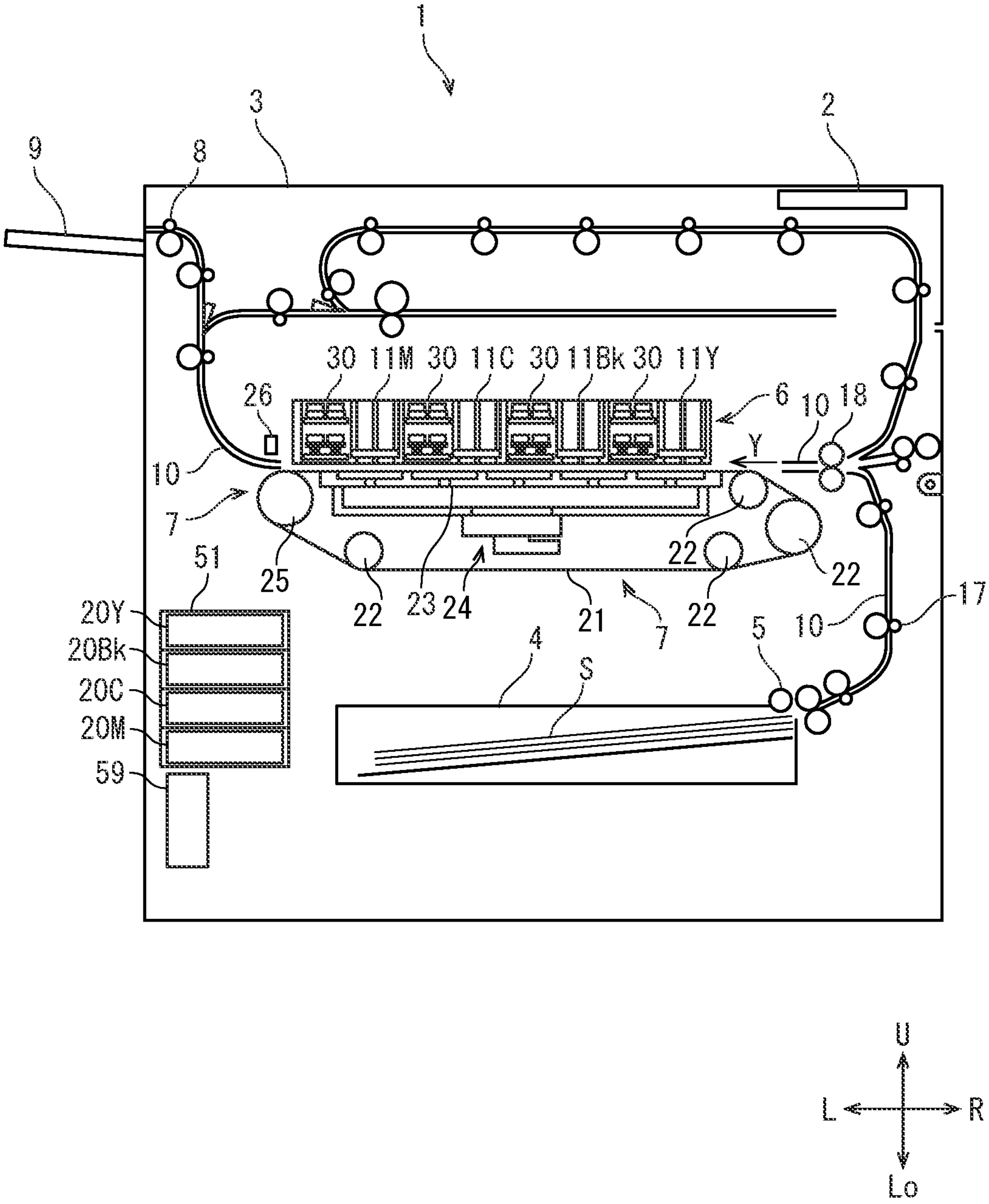
FIG. 1 is a front view schematically showing an inner structure of an inkjet recording apparatus according to one embodiment of the present disclosure.
Figure 2:
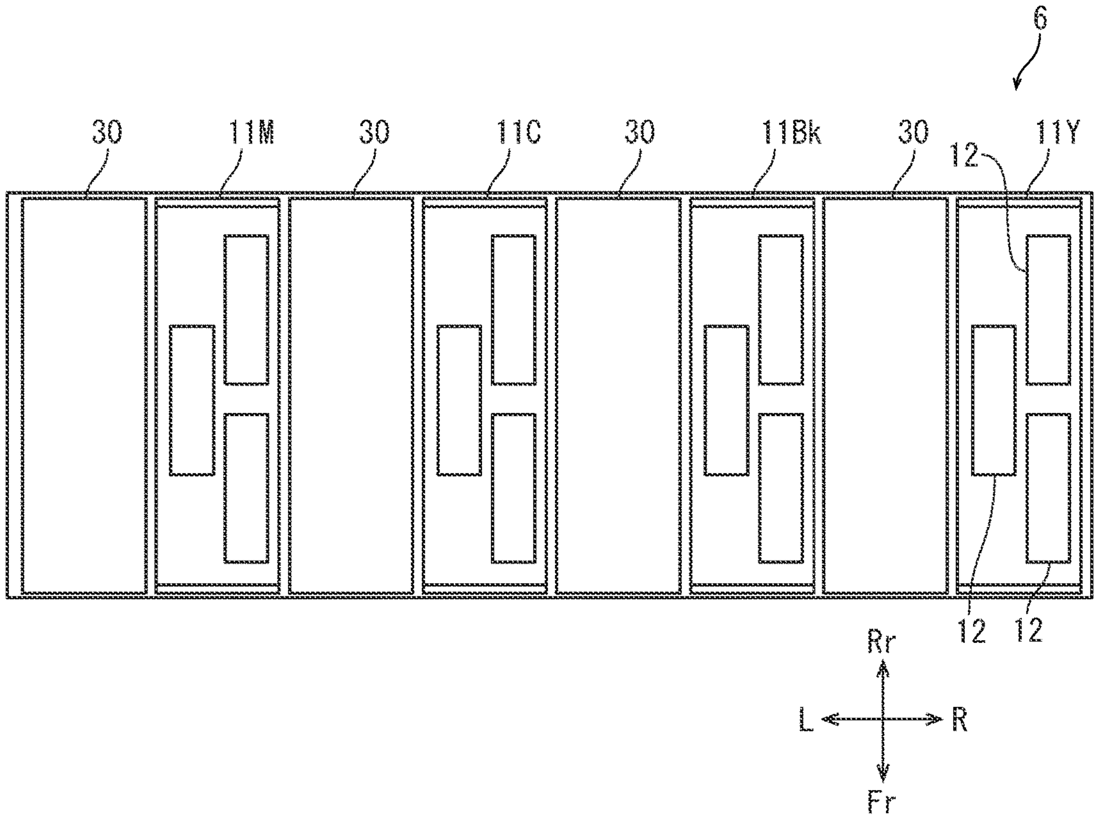
FIG. 2 is a plan view showing an image forming unit according to the embodiment of the present disclosure.
Figure 3:
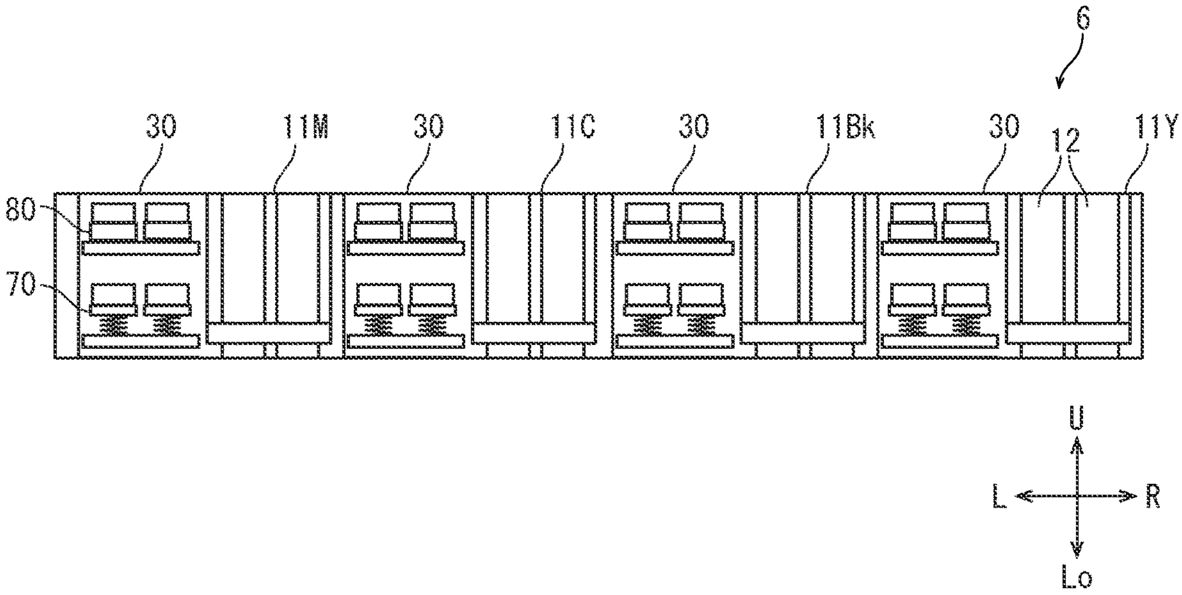
FIG. 3 is a cross-sectional view showing the image forming unit according to the embodiment of the present disclosure.
Figure 4:
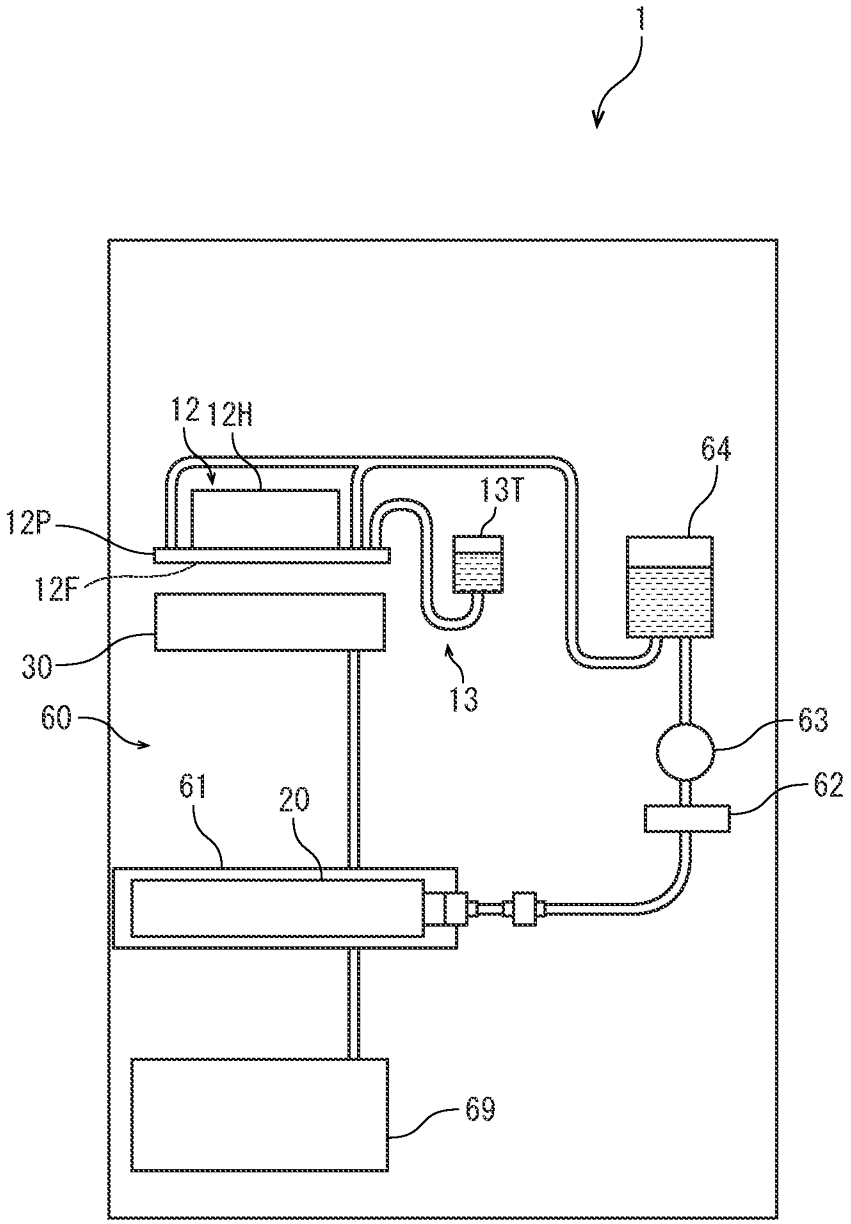
FIG. 4 is a view schematically showing an ink supply path according to the embodiment of the present disclosure.
Figure 5:
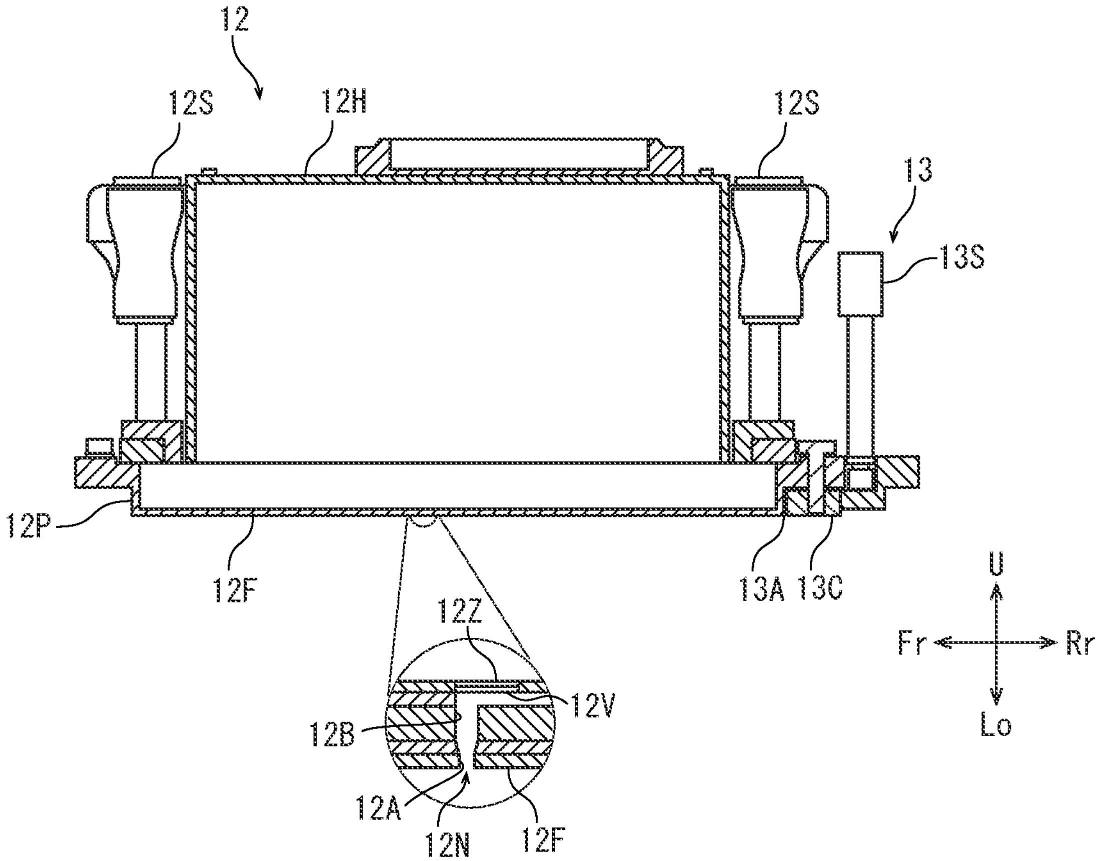
FIG. 5 is a cross-sectional view showing an inkjet head according to the embodiment of the present disclosure.

First, the entire configuration of the inkjet recording apparatus 1 will be described. FIG. 1 is a front view schematically showing the inside of the inkjet recording apparatus 1. FIG. 2 is a plan view showing the image forming unit 6. FIG. 3 is a cross-sectional view showing the image forming unit 6. FIG. 4 is a schematic view showing an ink supply path 60. FIG. 5 is a cross-sectional view showing an inkjet head 12. Hereafter, the front side of the paper plane on which FIG. 1 is drawn is defined as the front side of the inkjet recording apparatus 1, and the left-and-right direction is described with reference to the direction in which the inkjet recording apparatus 1 is viewed from the front side. In each figure, U, Lo, L, R, Fr and Rr indicate the upper, bottom, left, right, front and rear, respectively.

The inkjet recording apparatus 1 (see FIG. 1) includes a rectangular box-shaped body housing 3. In the lower portion in the body housing 3, a sheet feeding cassette 4 in which a sheet such as a plain paper and a coated paper and a sheet feeding roller 5 which feeds the sheet S from the sheet feeding cassette 4 are provided. Above the sheet feeding cassette 4, a conveying unit 7 is provided to attract the sheet S and convey it in the Y direction. An image forming unit 6 is provided above the conveying unit 7 to form an image by ejecting ink. A discharge roller 8 which discharges the sheet S having an image and a discharge tray 9 on which the discharged sheet S are stacked are provided in the upper left portion in the body housing 3.

Inside the body housing 3, a conveyance path 10 is provided from the sheet feeding roller 5 through a gap between the conveying unit 7 and the image forming unit 6 to the discharge roller 8. The conveyance path 10 is formed mainly by plate-like members facing each other with a gap for passing the sheet S. The conveyance path 10 is provided with a conveyance roller 17 which holds the sheet S and conveys it. A registration roller 18 is provided on the upstream side of the image forming unit 6 in the conveyance direction Y.

The conveying unit 7 includes an endless conveyance belt 21, a support plate 23, and a suction part 24. The conveyance belt 21 has a number of vent holes (not shown) and is wound around a drive roller 25 and a driven roller 22. The support plate 23 has a number of vent holes, and the upper surface is in contact with the inner surface of the conveyance belt 21. The suction part 24 attracts the sheet S to the conveyance belt 21 by sucking air through the vent holes of the support plate 23 and the vent holes of the conveyance belt 21. When the drive roller 25 is driven in the counterclockwise direction by a drive unit (not shown) including a motor and a reduction gear, the conveyance belt 21 travels in the counterclockwise direction, and the sheet S attracted by the conveyance belt 21 is conveyed in the Y direction.

The image forming unit 6 (see FIG. 2 and FIG. 3) includes head units 11Y, 11Bk, 11C, and 11M (collectively referred to as a head unit 11). The head unit 11 includes one or more inkjet heads 12, for example, three inkjet heads 12 arranged in a zigzag arrangement. Ink containers 20Y, 20Bk, 20C, and 20M (collectively referred to as an ink container 20) filled with yellow, black, cyan, and magenta inks are connected to the head units 11Y, 11Bk, 11C, and 11M, respectively, through ink supply paths 60 (see FIG. 4).

In FIG. 4, the ink supply path 60 corresponding to one color of ink is shown, but since four colors of the ink are used in this embodiment, four ink supply paths 60 are provided. The inkjet recording apparatus 1 includes a container attachment part 61 to which the ink container 20 is attached, a filter 62 which filters the ink, a pump 63 which pumps the ink from the ink container 20 through the filter 62, and a sub-ink tank 64 in which the ink fed from the pump 63 is stored. Although one inkjet head 12 is shown in FIG. 4, three inkjet heads 12 corresponding to one head unit 11 are connected to one sub-ink tank 64.

The inkjet head 12 (see FIG. 5 and FIG. 6) includes a rectangular box housing 12H whose longitudinal direction is along the front-and-rear direction, and a nozzle plate 12P provided at the bottom of the housing 12H. The nozzle plate 12P includes a number of nozzles 12N lined up in the front-and-rear direction and a socket 12S to which a pipe from the sub-ink tank 64 is connected. The nozzle 12N includes a branch channel 12B branched on the downstream side of the socket 12S and a discharge port 12A provided on the nozzle surface 12F, which is the lower surface of the nozzle plate 12P. A diaphragm 12V forms a part of the inner wall of the branch channel 12B. The diaphragm 12V is provided with a pressurizing element 12Z. As the pressurizing element 12Z, a piezoelectric element, an electrostatic actuator, a heater or the like is used. A drive circuit (not shown) for driving the pressurizing element 12Z is connected to the pressurizing element 12Z. A liquid level in the sub-ink tank 64 is adjusted to be slightly lower than the nozzle surface 12F. By lowering the liquid level below the nozzle surface 12F, a negative pressure is generated in the nozzle 12N, forming a concave meniscus concave upward.

The control part 2 (see FIG. 1) includes an arithmetic part and a storage part (not shown). The arithmetic part is, for example, a CPU (Central Processing Unit). The storage part includes a storage media such as a ROM (Read Only Memory), a RAM (Random Access Memory) and an EEPROM (Electrically Erasable Programmable Read Only Memory). The arithmetic part performs various processes by reading and executing the control program stored in the storage part. The control part 2 may be realized by an integrated circuit without using software.

A display operating part 19 is provided on the upper portion of the body housing 3 (see FIG. 1). The display operating part 19 is equipped with a display panel, a touch panel laminated on the display panel, and a keypad (not shown). The control part 2 displays a screen showing the operation menu, status, or the like of the inkjet recording apparatus 1 on the display panel, and controls each part of the inkjet recording apparatus 1 according to the operation detected by the touch panel and keypad.

The basic image forming operation of the inkjet recording apparatus 1 is as follows. When an image forming job is input to the inkjet recording apparatus 1 from the display operating part 19 or an external computer, the sheet feeding roller 5 feeds the sheet S from the sheet feeding cassette 4 to the conveyance path 10, and the registration roller 18, whose rotation is stopped, corrects the skew of the sheet S. When the registration roller 18 feeds the sheet S to the conveying unit 7 at a prescribed timing, the conveying unit 7 attracts the sheet S to the conveyance belt 21 and conveys it in the Y direction. When the control part 2 supplies the raster-type image data to the driving circuit in synchronization with the conveyance of the sheet S, the driving circuit supplies an ejection signal corresponding to the gradation of the image data to the pressurizing element 12Z, and the ink is ejected from the nozzle 12N to form an image on the sheet S. The discharge roller 8 discharges the sheet S on which the image is formed to the discharge tray 9.

Figure 6:
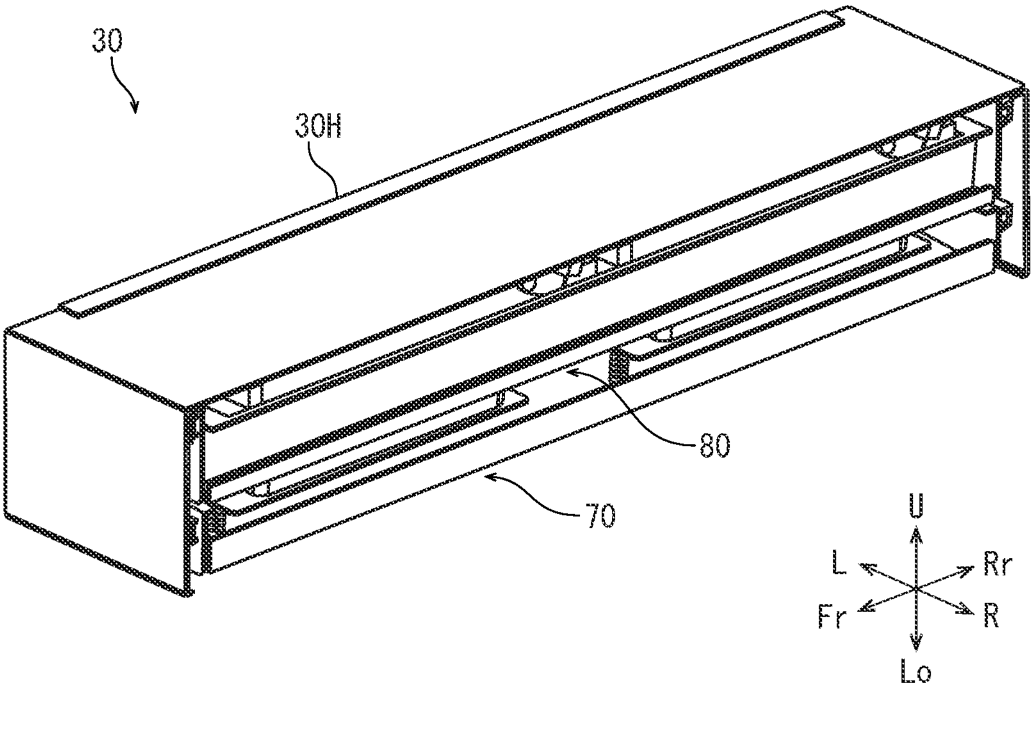
FIG. 6 is a perspective view showing a maintenance device according to the embodiment of the present disclosure.
Figure 7:
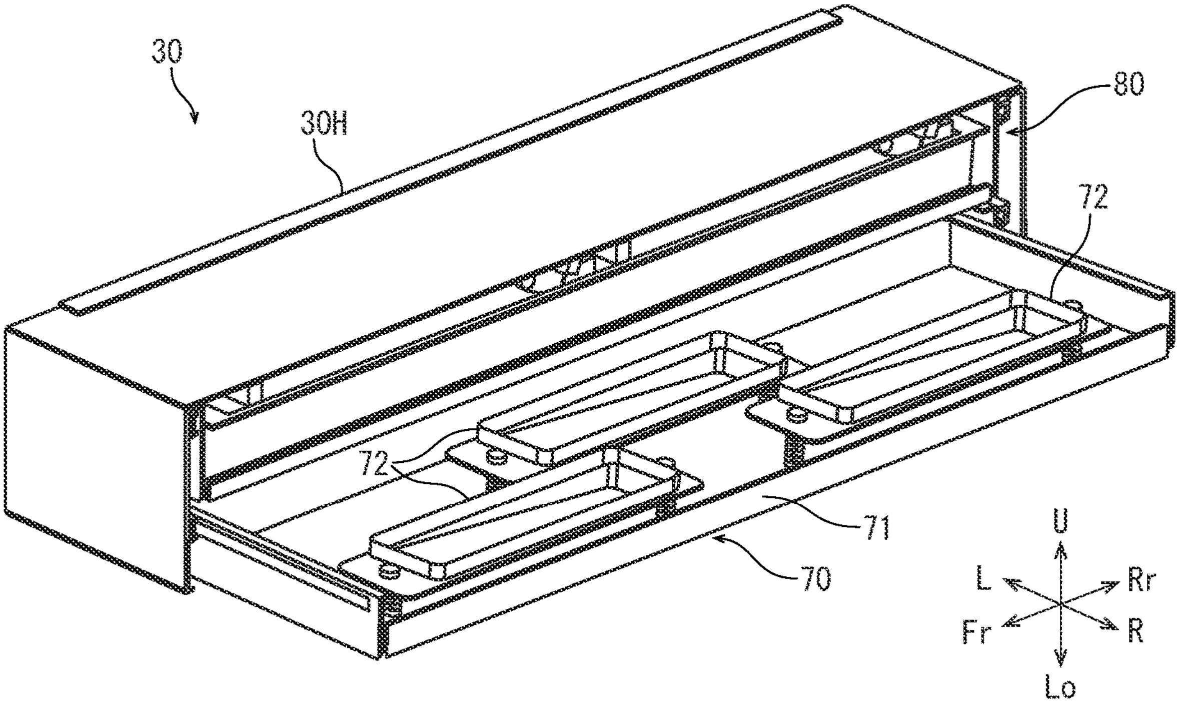
FIG. 7 is a perspective view showing a cap unit moved rightward according to the embodiment of the present disclosure.
Figure 8:
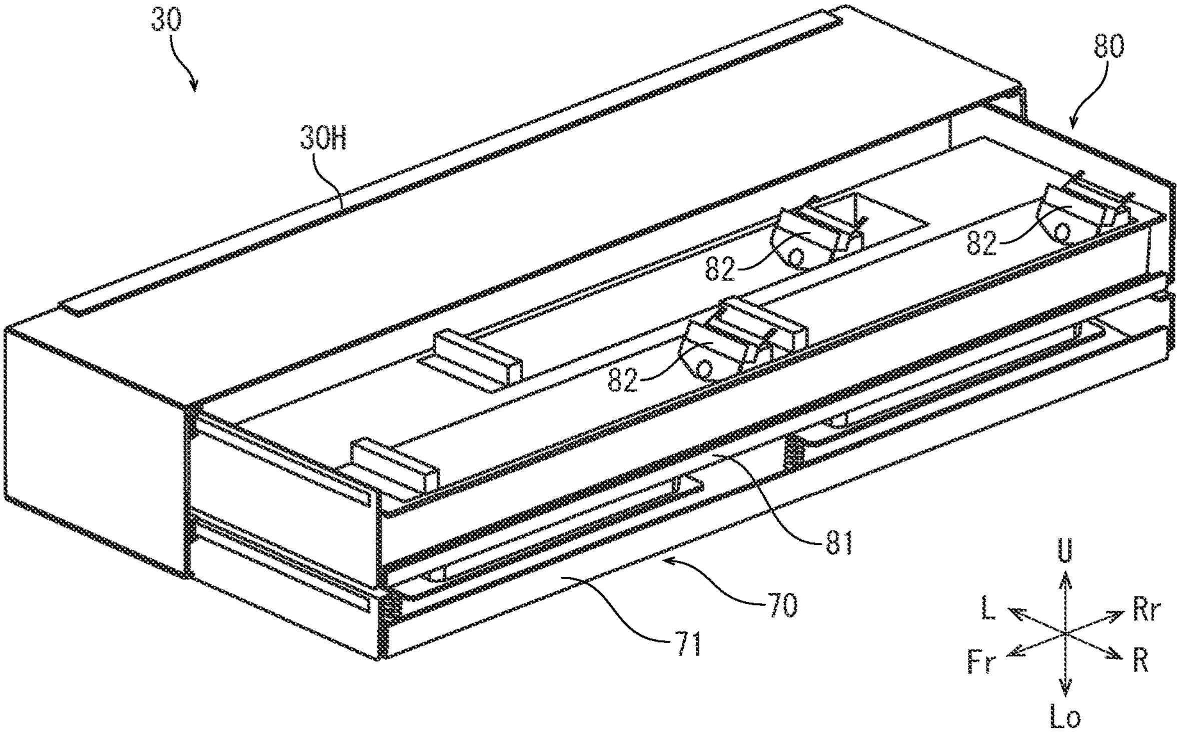
FIG. 8 is a perspective view showing the cap unit and a wipe unit moved rightward according to the embodiment of the present disclosure.

[Maintenance Device] Next, the configuration of the maintenance device 30 will be described. FIG. 6 is a perspective view showing the maintenance device 30. FIG. 7 is a perspective view showing the cap unit 70 moved rightward. FIG. 8 is a perspective view showing a wipe unit 80 and the cap unit 70 moved rightward.

The maintenance device 30 is provided on the right side of each head unit 11 (on the downstream side of each head unit 11 in the conveyance direction Y) (see FIG. 2 and FIG. 3). The maintenance device 30 may be provided on the right side of each head unit 11 (on the upstream side of each head unit 11 in the conveyance direction Y). The maintenance device 30 includes a cap unit 70 with a cap 72 mounted on the nozzle surface 12F, a wipe unit 80 with a blade 82 to remove the ink remaining on the nozzle surface 12F, and a housing 31 housing the cap unit 70 and the wipe unit 80. The housing 31 is formed in a rectangular box shape whose longitudinal direction is along the front-and-rear direction, and an opening is provided on the right side surface. The maintenance device 30 includes a cap moving mechanism (not shown) that moves the cap unit 70 in the left-and-right direction, and a wipe moving mechanism (not shown) that and moves the wipe unit 80 in the left-and-right direction. The cap moving mechanism and the wipe moving mechanism are, for example, a belt drive mechanism, a rack and pinion mechanism, a feed screw mechanism, or the like.

[Cap Unit] The cap unit 70 (see FIG. 8) includes a frame 71 and a cap 72 provided above the frame 71. The frame 71 is formed into a rectangle whose longitudinal direction is along the front-and-rear direction. The same number of caps 72 as the inkjet heads 12 are disposed on the frame 71 in the same zigzag arrangement as the inkjet head 12. The cap 72 has an upper open recess. The recess has a size that surrounds the nozzle surface 12F of one inkjet head 12. The bottom of the recess is inclined so that one side (in this example, the rear side) in the front-and-rear direction is lower. A discharge port is provided at the lower end of the bottom of the recess (not shown). A waste liquid tank 69 (see FIG. 4) is connected to the discharge port.

[Wipe Unit] The wipe unit 80 (see FIG. 9) includes a frame 81, a carriage 83 provided above the frame 81, a blade 82 protruding upward from the carriage 83, and a slide moving mechanism (not shown) which moves the carriage 83 in the front-and-rear direction. The frame 81 is formed into a rectangle whose longitudinal direction is along the front-and-rear direction. The same number of blades 82 as the inkjet heads 12 are disposed in the carriage 83 in the same zigzag arrangement as the inkjet heads 12.

[Lifting Mechanism] The inkjet recording apparatus 1 includes a lifting mechanism (not shown) which lifts and lowers the head unit 11. The lifting mechanism is, for example, a belt drive mechanism, a rack and pinion mechanism, a feed screw mechanism, or the like. The lifting mechanism lifts and lowers the head unit 11 between an image forming position when the image is formed and the retreating position above the image forming position. In the image forming position, the head unit 11 is positioned so that the distance between the conveyance belt 21 and the nozzle surface 12F is a predetermined distance. In the retreating position, a space in which the cap unit 70 and the wipe unit 80 can be moved is formed between the conveyance belt 21 and the nozzle surface 12F.

[Cleaning Liquid Supplying Part] The inkjet head 12 includes a cleaning liquid supplying part 13 (see FIG. 4 and FIG. 5) which supplies cleaning liquid to the nozzle surface 12F. The cleaning liquid supplying part 13 includes a cleaning liquid tank (not shown), a pump (not shown), a sub-cleaning liquid tank 13T, and a connecting member 13C. In the cleaning liquid tank, water-based cleaning liquid is stored. The pump is connected to the bottom of the sub-cleaning liquid tank 13T, and supplies the cleaning liquid from the cleaning liquid tank to the sub-cleaning liquid tank 13T. The connecting member 13C is provided behind the nozzle plate 12P. The connecting member 13C includes a socket 13S to which the pipe from the sub-cleaning liquid tank 13T is connected. A cleaning liquid supply port 13A is provided at the bottom of the connecting member 13C. The liquid level in the sub-cleaning liquid tank 13T is adjusted to be slightly higher than the bottom surface of the connecting member 13C. By raising the liquid level higher than the bottom surface, positive pressure is generated in the cleaning liquid supply port 13A, and a convex meniscus bulging downward is formed.

Figure 9:
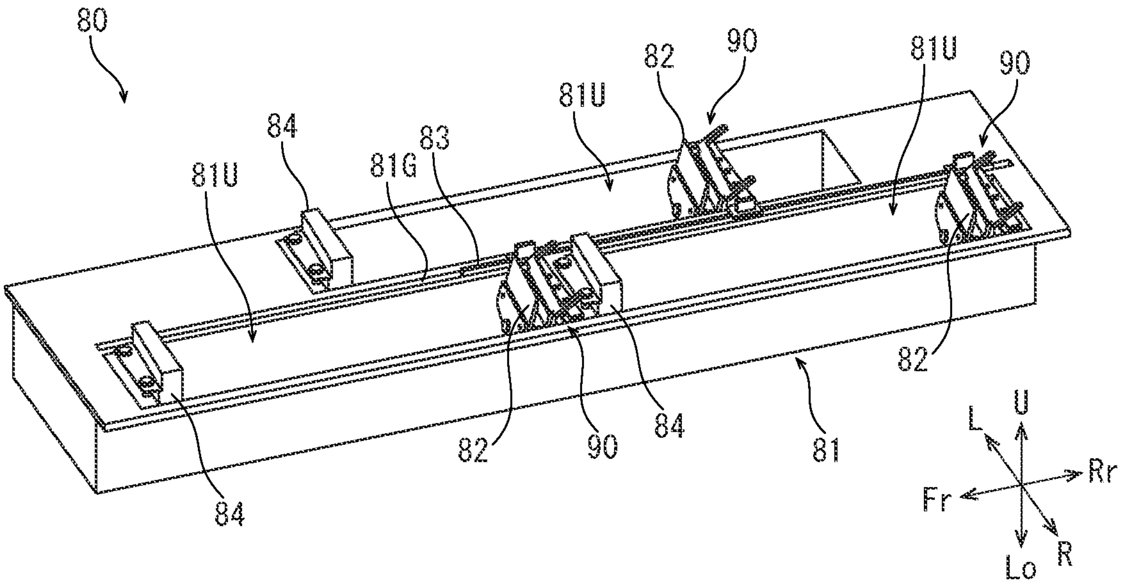
FIG. 9 is a perspective view showing the wipe unit according to the embodiment of the present disclosure.
Figure 10:
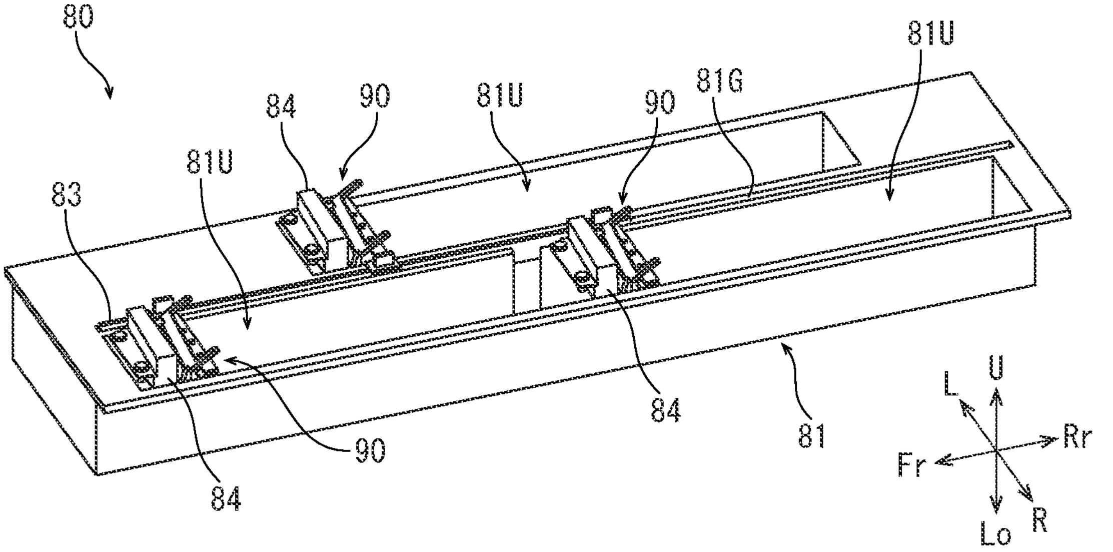
FIG. 10 is a perspective view showing the wipe unit according to the embodiment of the present disclosure.
Figure 11:
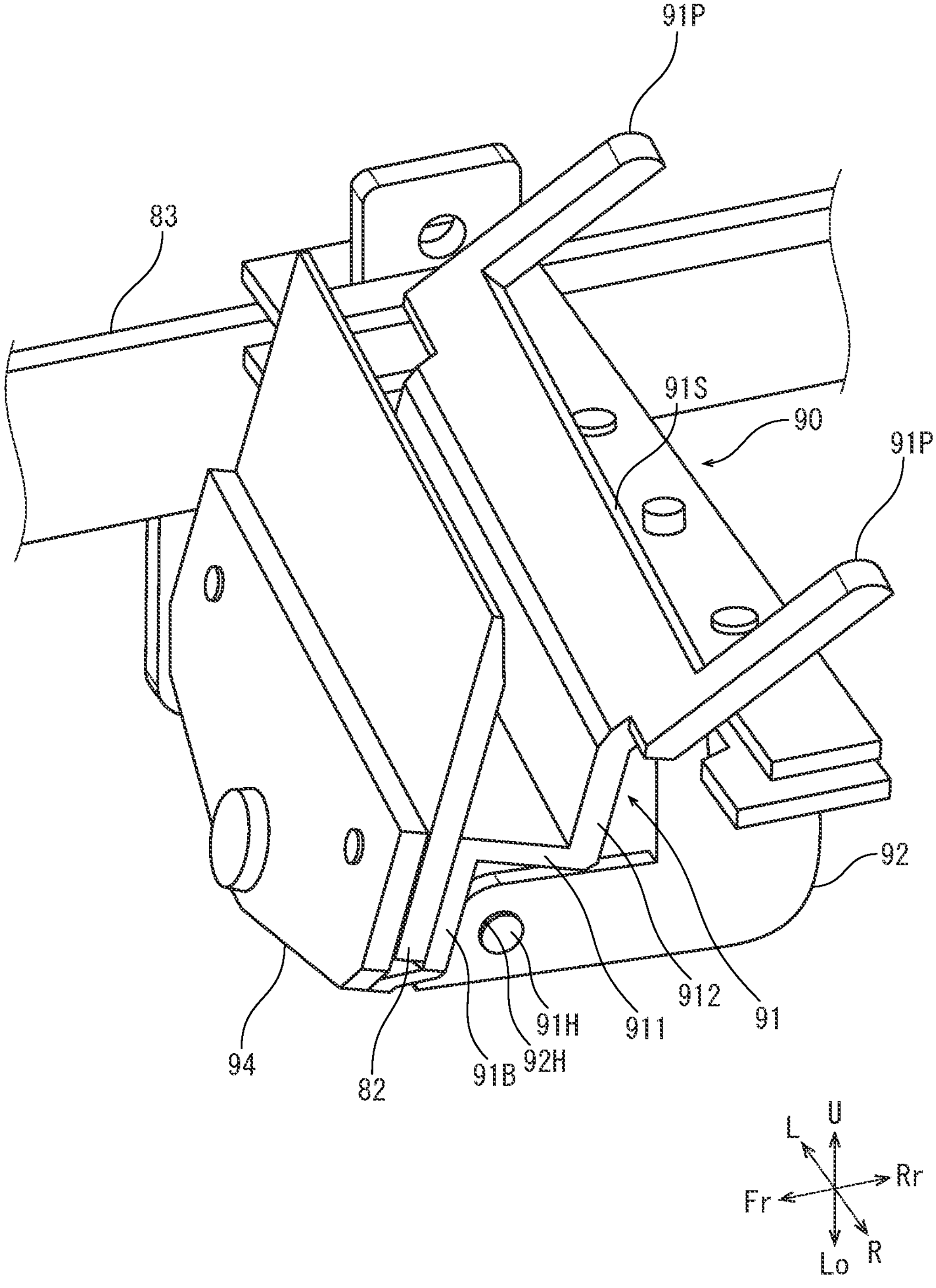
FIG. 11 is a perspective view showing a blade unit according to the embodiment of the present disclosure.
Figure 12:
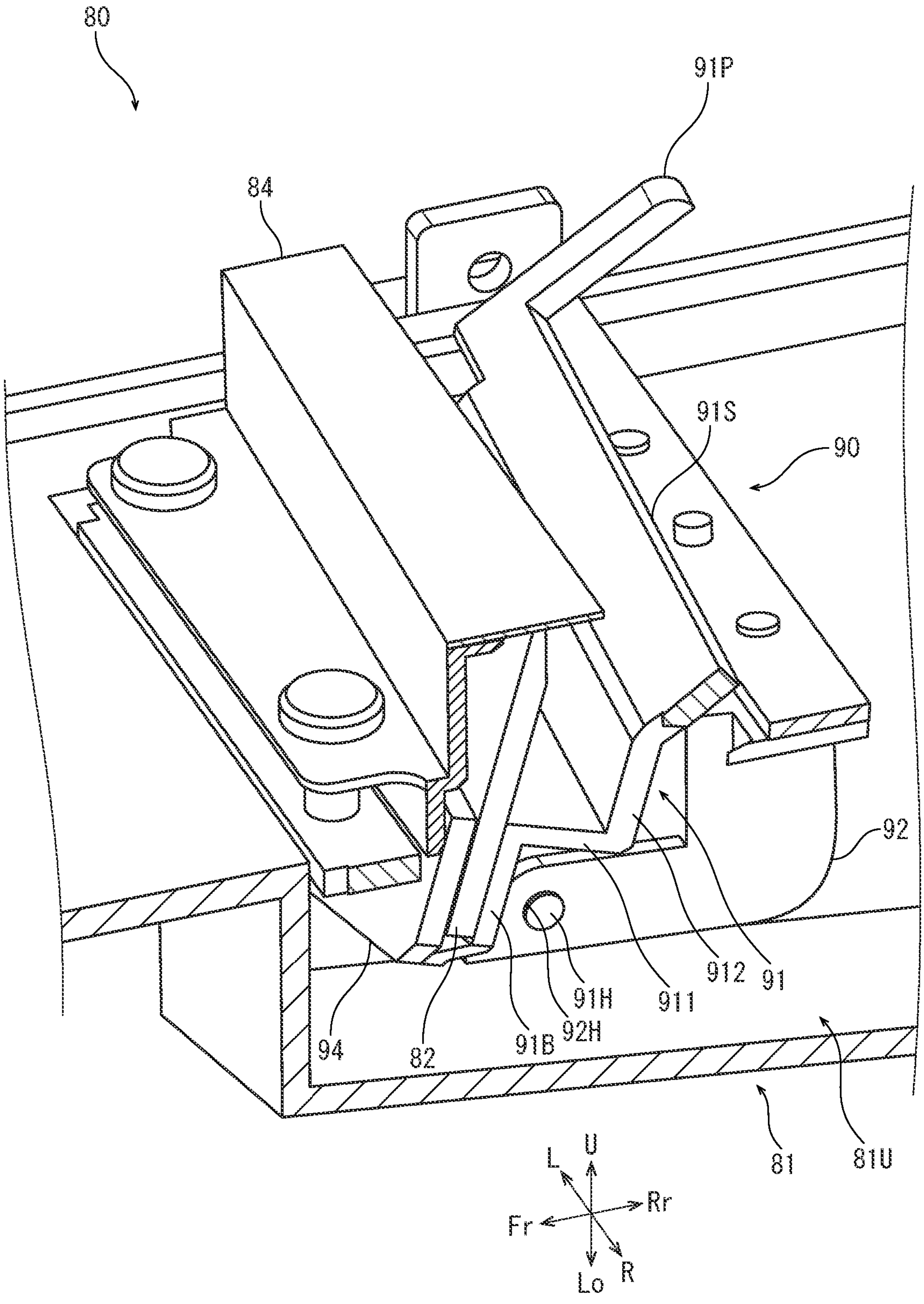
FIG. 12 is a cross-sectional view showing the blade unit according to the embodiment of the present disclosure.
Figure 13:
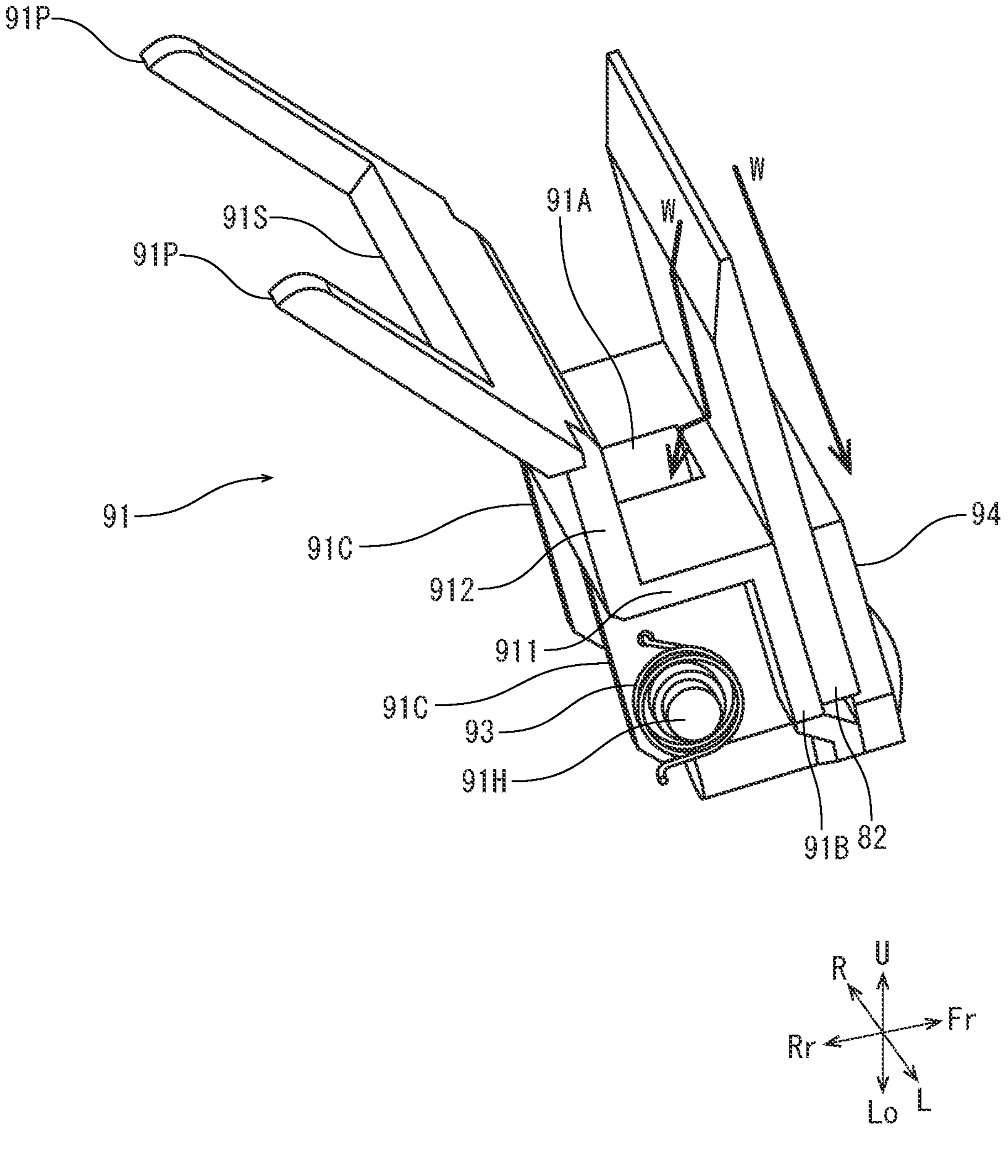
FIG. 13 is a perspective view showing a protruding member according to the embodiment of the present disclosure.
Figure 14:
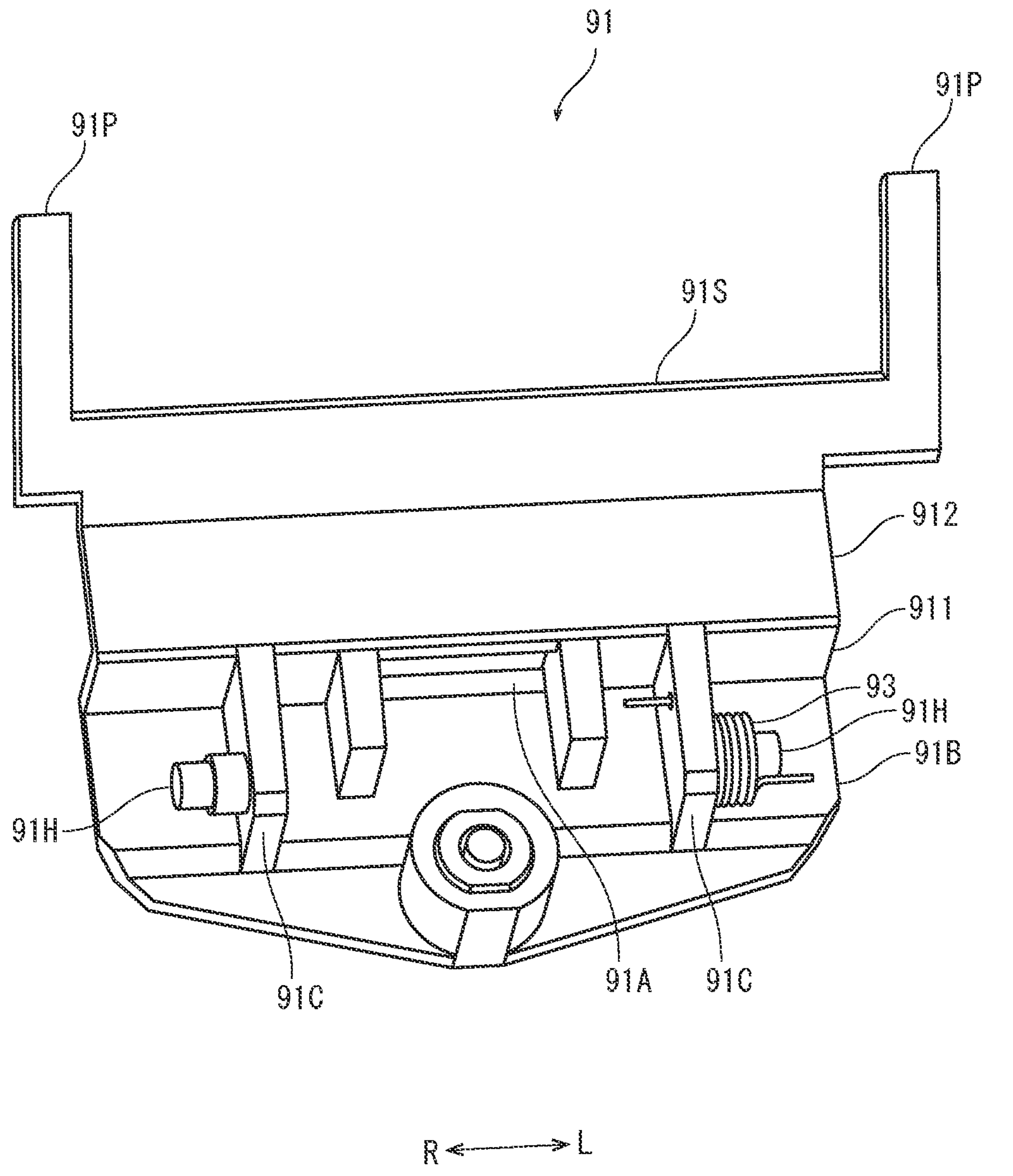
FIG. 14 is a perspective view showing the protruding member according to the embodiment of the present disclosure.
Figure 15:
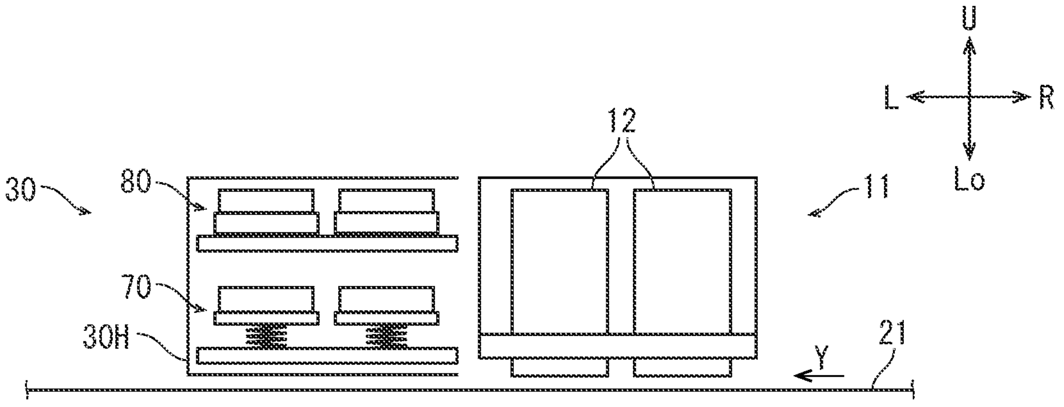
FIG. 15 is a cross-sectional view showing an operation of the maintenance device and the head unit according to the embodiment of the present disclosure.

Next, the wipe unit 80 will be described in detail. FIG. 9 and FIG. 10 are perspective views showing the wipe unit 80. FIG. 11 is a perspective view showing a blade unit 90. FIG. 12 is a perspective view showing a cross section of the wipe unit 80. FIG. 13 is a perspective view showing a protruding member 91 and a blade 82. FIG. 14 is a perspective view showing the protruding member 91.

The inkjet recording apparatus 1 according to this embodiment is provided with a holder 92 which faces the nozzle surface 12F of the inkjet head 12 and moves in a predetermined traveling direction D along the nozzle surface 12F, a blade 82 which is provided in the holder 92 and swings around an axis intersecting with the traveling direction D, and a biasing member 93 which is provided in the holder 92 and biases the blade 82 in a direction that pushes the tip of the blade 82 against the nozzle surface 12F. Specifically, they are as follows.

The wipe unit 80 (see FIG. 9 and FIG. 10) includes multiple (in this embodiment, three) blade units 90, a frame 81, and a carriage 83. The blade unit 90 (see FIG. 11 and FIG. 12) includes a blade 82, a protruding member 91, a holder 92, and a biasing member 93.

[Blade] The blade 82 (see FIG. 11 to FIG. 13) is a flexible plate-like member made of resin or the like. The blade 82 is held by the holder 92 in a slightly rearward tilted posture in which the thickness direction is along the front-and-rear direction. The width of the blade 82 in the left-and-right direction is not less than the width of the area where the nozzle 12N is provided on the nozzle surface 12F.

[Protruding Member] The protruding member 91 (see FIG. 11 to FIG. 14) is integrated with the blade 82. The protruding member 91 has a base 91B parallel to the blade 82, a first bend portion 911 bent rearward from the upper end of the base 91B, a second bend portion 912 bent upward from the rear end of the first bend portion 911, a rearward tilted portion 91S tilted more rearward than the second bend portion 912, and protruding portions 91P protruding upward from the upper end of the rearward tilted portion 91S. The width of the base 91B in the left-and-right direction is equal to the width of the blade 82. The length of the base 91B in the upper-and-lower direction is about ½ of the length of the blade 82. The base 91B is joined to the lower portion of the rear surface of the blade 82. The base 91B has a shaft 91H whose axial direction is along the left-and-right direction (see FIG. 13 and FIG. 14). In the example of FIG. 11, the blade 82 is held and screwed between the base 91B and a metal sheet member 94. The widths of the first bend portion 911 and the second bend portion 912 in the left-and-right direction are equal to the width of the base 91B.

The width of the rearward tilted portion 91S is wider than the width of the blade 82. The protruding portions 91P are provided at both left and right ends of the upper end of the rearward tilted portion 91S. The protruding portions 91P are provided on the outside of the blade 82 in the left-and-right direction. In other words, the protruding portions 91P are provided outside the area where the nozzle 12N is provided on the nozzle surface 12F in the left-and-right direction. The protruding portions 91P are tilted rearward at an inclination angle equal to that of the rearward tilted portion 91S. A through-hole 91A penetrating downward is provided at the center of the first bend portion 911 in the left-and-right direction. At least a part of the waste liquid W (a mixture of the ink i and the cleaning liquid F) which flows down along the rear surface of the blade 82 is discharged downward through the through-hole 91A.

[Holder] The holder 92 (see FIG. 11 and FIG. 12) holds the blade 82. A hole 92H into which the shaft 91H of the protruding member 91 is inserted is provided in the lower portion of the holder 92 (see FIG. 11 and FIG. 12). On the rear surface of the base 91B, two wall parts 91C facing each other in the left-and-right direction are provided. The shaft 91H protruding leftward is provided on the left side surface of the left wall part 91C. The shaft 91H protruding rightward is provided on the right side surface of the right wall part 91C. The protruding member 91 is hinged with respect to the holder 92, and the protruding member 91 can be swung in the front-and-rear direction with respect to the holder 92. The blade 82 swings with the protruding member 91. The shaft 91H may be provided on the blade 82.

The blade 82 and the protruding member 91 are provided on the holder 92 in a posture inclined to the left-and-right direction so that the waste liquid W flows in one direction of the left-and-right direction. In the example shown, the left end portion of the blade 82 is tilted slightly behind the right end portion, but may be tilted in the opposite direction.

[Biasing Member] The biasing member 93 (see FIG. 13 and FIG. 14) is, for example, a torsion coil spring, and is wound around the shaft 91H. One end of the biasing member 93 is engaged with the holder 92 and the other end is engaged with the protruding members 91. The biasing member 93 biases the protruding members 91 in the counterclockwise direction in FIG. 11 and FIG. 12 and in the clockwise direction in FIG. 13. In other words, the biasing member 93 biases the blade 82 in a direction that pushes the tip of the blade 82 against the nozzle surface 12F. The biasing member 93 may be a leaf spring, a compression coil spring, or the like.

[Frame] The frame 81 (see FIG. 9 and FIG. 10) is formed as a whole in a rectangular box-like shape whose longitudinal direction is along the front-and-rear direction. The frame 81 has three recesses 810 opened upward. Each of the three recesses 81U faces the three inkjet heads 12 provided in the head unit 11. That is, the three recesses 81U include two recesses 810 arranged along the front-and-rear direction and one recess 81U arranged in a zigzag arrangement on the left side of the two recesses 81U. The recess 81U is formed into an elongated rectangular shape in the front-and-rear direction when viewed from above. The length of the recess 81U in the front-and-rear direction is slightly longer than the nozzle surface 12F, and the width of the recess 81U in the left-and-right direction is slightly wider than the nozzle surface 12F.

[Carriage] The carriage 83 (see FIG. 9 to FIG. 12) is formed in a plate-like shape whose longitudinal direction is along the front-and-rear direction. Between the left and right recesses 810, a grooves 81G along the front-and-rear direction is provided, and the carriage 83 is accommodated in the groove 81G. The 1 length of the carriage 83 in the front-and-rear direction is shorter than the length of the groove 81G. Therefore, the carriage 83 is movable in the front-and-rear direction along the groove 81G.

Each of the three recesses 810 contains one blade unit 90. Three blade units 90 are coupled to the carriage 83. The three blade units 90 are arranged so that when the carriage 83 is positioned rearmost, the three blade units 90 are positioned on the rear side of the nozzle surface 12F.

The frame 81 is provided with a drive part (not shown). The drive part is, for example, a belt drive, a rack-and-pinion, a feed screw, or the like, and moves the carriage 83 in the front-and-rear direction along the groove 81G. The carriage 83, the groove 81G, and the drive part constitute the carriage moving mechanism described above.

[Receiving Member] A receiving member 84 (see FIG. 9, FIG. 10 and FIG. 12) is provided at the front end portion of the recess 810. The receiving member 84 is formed in a box shape with the rear portion and the lower portion opened. When the blade 82 reaches the most front of the recess 810, the blade 82 is accommodated in the receiving member 84. At this time, the blade 82 is covered from the front, upper, left and right sides by the receiving member 84.

Next, the operation of the maintenance device 30 will be described. FIG. 15 to FIG. 20 are cross-sectional views showing the operation of the maintenance device 30 and the head unit 11. FIG. 21 to FIG. 25 are side views schematically showing the operation of the blade unit 90.

Here, a parallel surface 11P will be described. The inkjet head 12 is supported by a head base 11B (see FIG. 21). The head base 11B has a through-hole into which the nozzle plate 12P of the inkjet head 12 is inserted. The lower surface of the head base 11B is called the parallel surface 11P because it is a surface parallel to the nozzle surface 12F. When the nozzle plate 12P is inserted into the head base 11B, the nozzle surface 12F protrudes downward from the parallel surface 11P by a few millimeters, and a step is formed between the parallel surface 11P and the nozzle surface 12F. The parallel surface 11P may be different from the present embodiment except that it is parallel to the nozzle surface 12F. For example, the parallel surface 11P and the nozzle surface 12F may be at the same height. Alternatively, the parallel surface 11P may be a portion of the nozzle surface 12F, that is, a surface located on the left and right sides of the region where the nozzle 12N is formed in the nozzle surface 12F.

Hereafter, a state in which the head unit 11 is positioned at the image forming position (see FIG. 15) is described as the initial state. The operations shown below are performed by the control part 2 controlling the lifting mechanism, the cap moving mechanism, the wipe moving mechanism, and the carriage moving mechanism.

Figure 16:
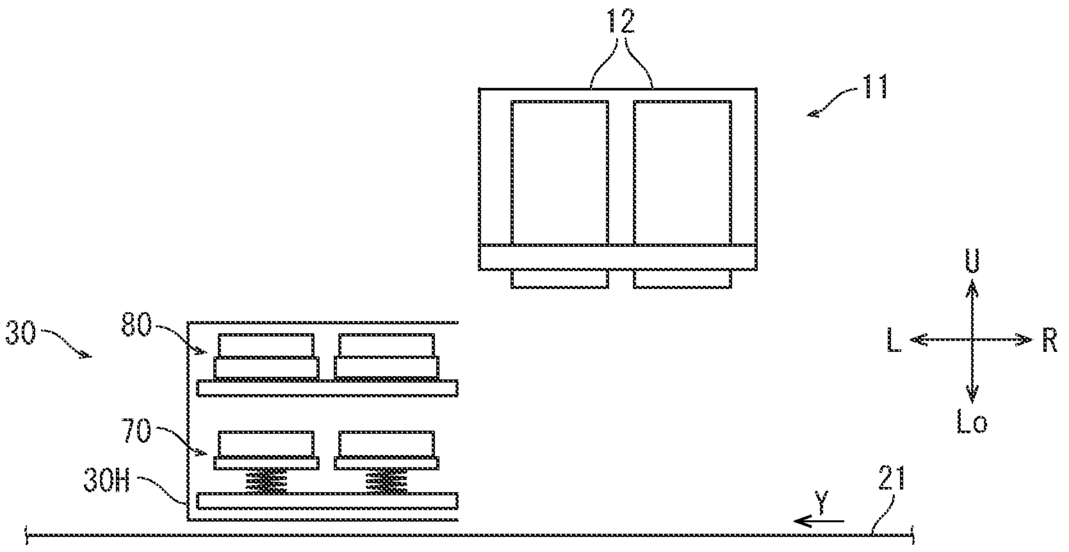
FIG. 16 is a cross-sectional view showing the operation of the maintenance device and the head unit according to the embodiment of the present disclosure.

First, the control part 2 operates the lifting mechanism to lift the head unit 11 to the retreating position (see FIG. 16). Then, the control part 2 operates the cap moving mechanism to move the cap unit 70 below the head unit 11 (see FIG. 17). Then, the control part 2 operates the lifting mechanism to lower the head unit 11 to the height where the nozzle surface 12F is in contact with the cap 72 (see FIG. 18). Next, the control part 2 controls the inkjet head 12 to cause the cap 72 to purge the ink.

Figure 17:
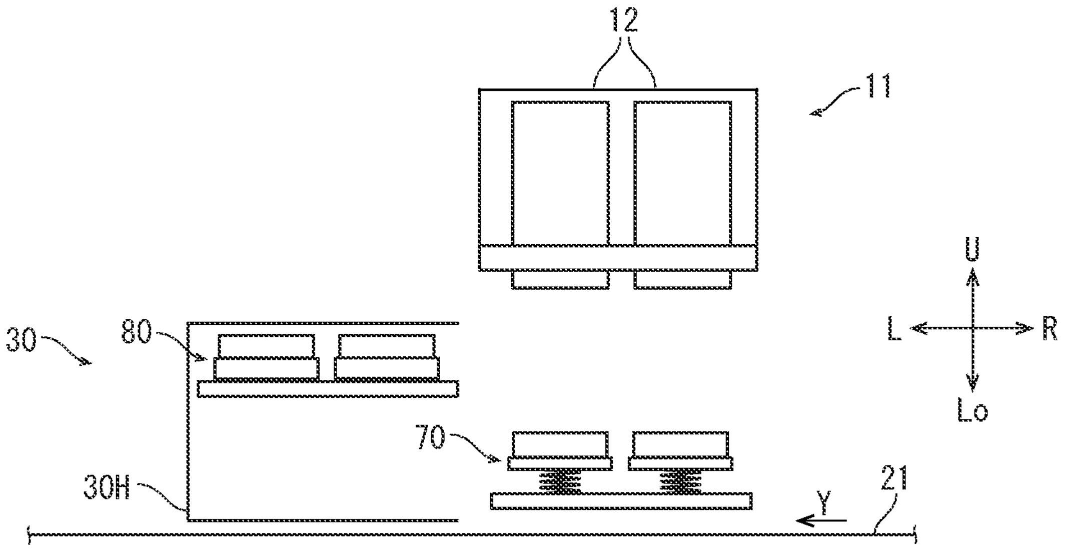
FIG. 17 is a cross-sectional view showing the operation of the maintenance device and the head unit according to the embodiment of the present disclosure.
Figure 18:
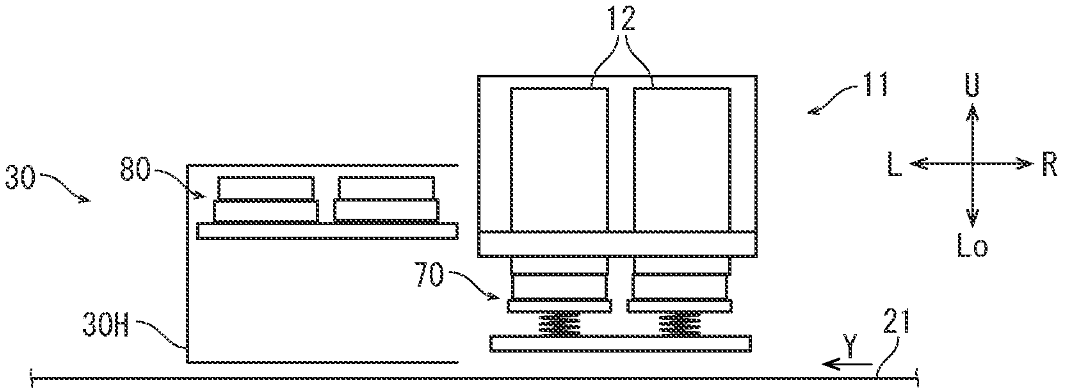
FIG. 18 is a cross-sectional view showing an operation of the maintenance device and the head unit according to the embodiment of the present disclosure.

Next, the control part 2 operates the lifting mechanism to lift the head unit 11 to the retreating position (see FIG. 17). Then, the control part 2 operates the wipe moving mechanism to move the wipe unit 80 below the head unit 11 (see FIG. 19). At this time, in the wipe unit 80, the blade unit 90 is positioned rearmost (see FIG. 21). The blade 82 is in a posture tilted rearward by an angle α with respect to the vertical (line segment V). The angle α is, for example, about 5 degrees. The ink i remains on the nozzle surface 12F.

Figure 20:
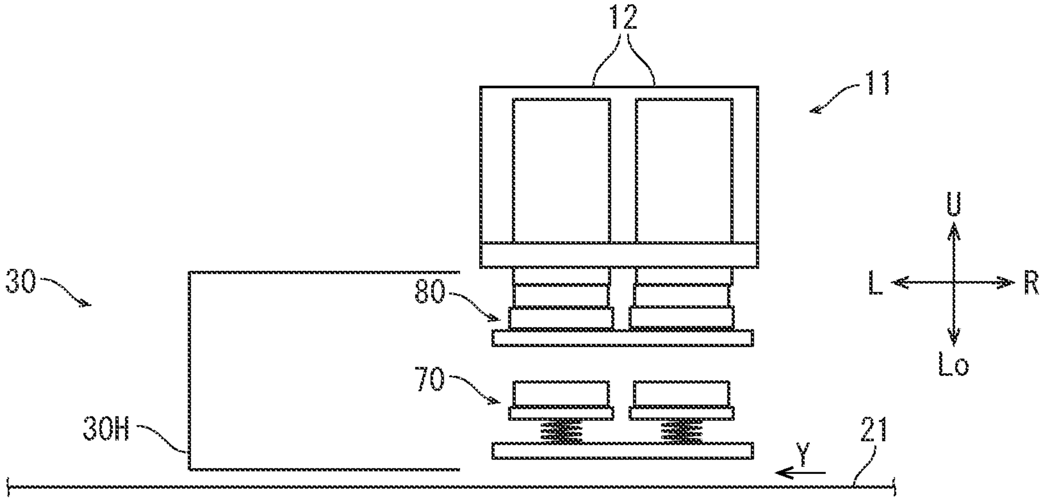
FIG. 20 is a cross-sectional view showing the operation of the maintenance device and the head unit according to the embodiment of the present disclosure.
Figure 21:
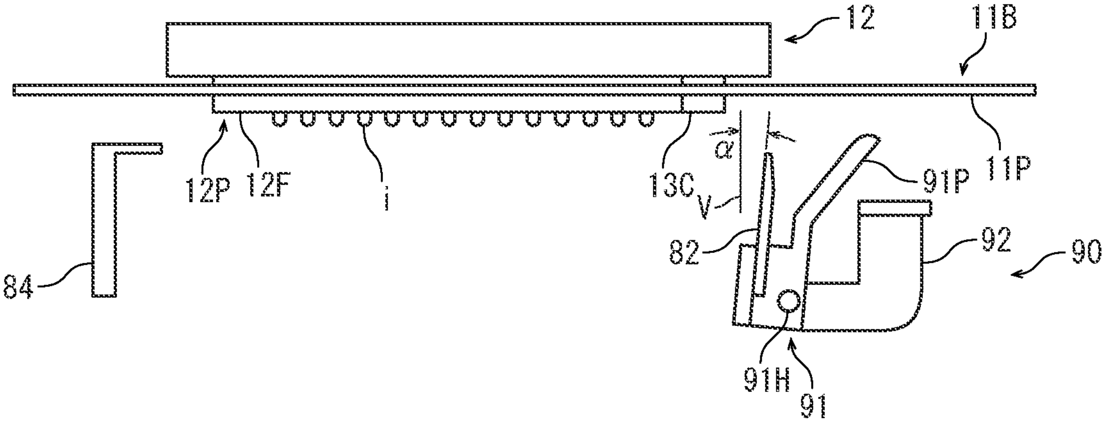
FIG. 21 is a side view schematically showing an operation of the blade unit according to the embodiment of the present disclosure.
Figure 22:
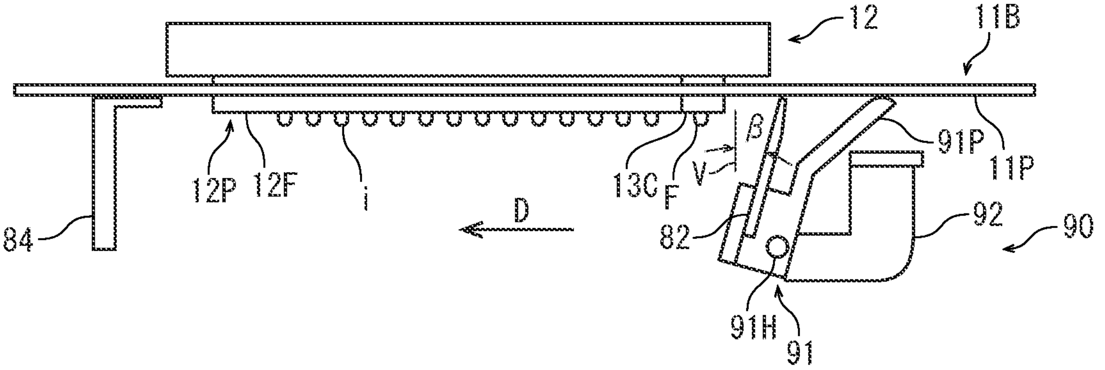
FIG. 22 is a side view schematically showing an operation of the blade unit according to the embodiment of the present disclosure.

Next, the control part 2 operates the lifting mechanism to lower the head unit 11 to a predetermined position (see FIG. 20). In the predetermined position (see FIG. 22), the parallel surface 11P pushes the protruding members 91 downward, causing the protruding members 91 and the blade 82 to swing in the clockwise direction and the blade 82 to tilt further rearward. At this time, the blade 82 is in a posture tilted rearward by an angle β (α<β) to the vertical. The angle β is, for example, about 15 degrees.

Figure 23:
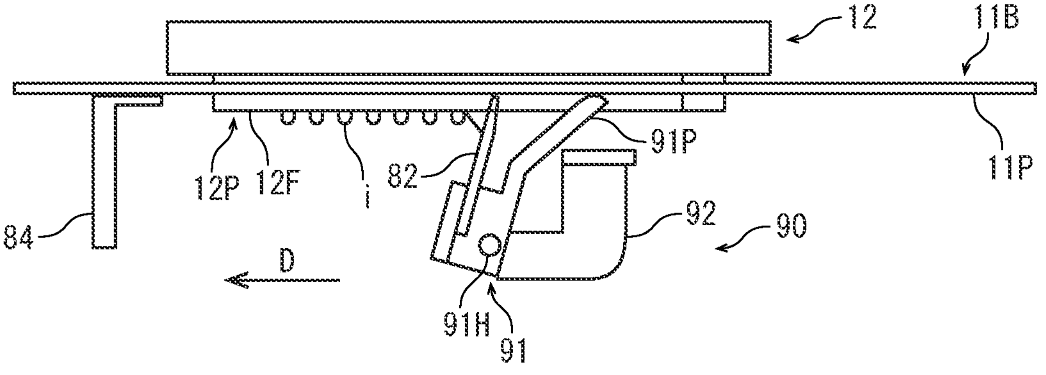
FIG. 23 is a side view schematically showing an operation of the blade unit according to the embodiment of the present disclosure.
Figure 24:
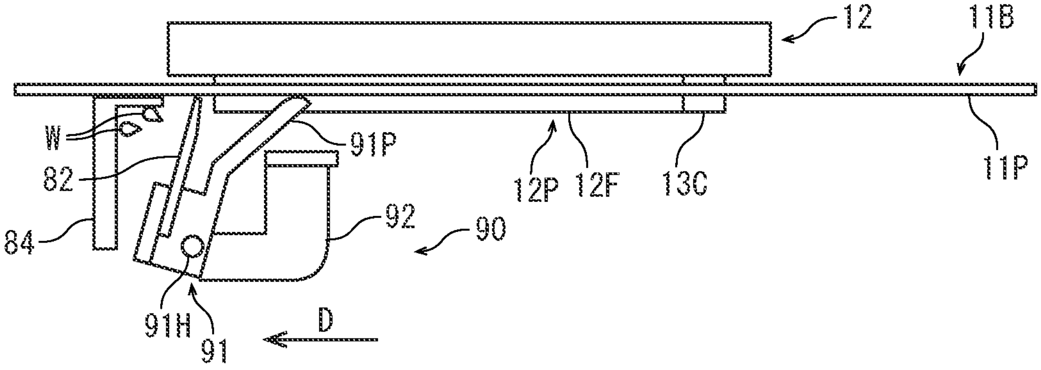
FIG. 24 is a side view schematically showing an operation of the blade unit according to the embodiment of the present disclosure.
Figure 25:
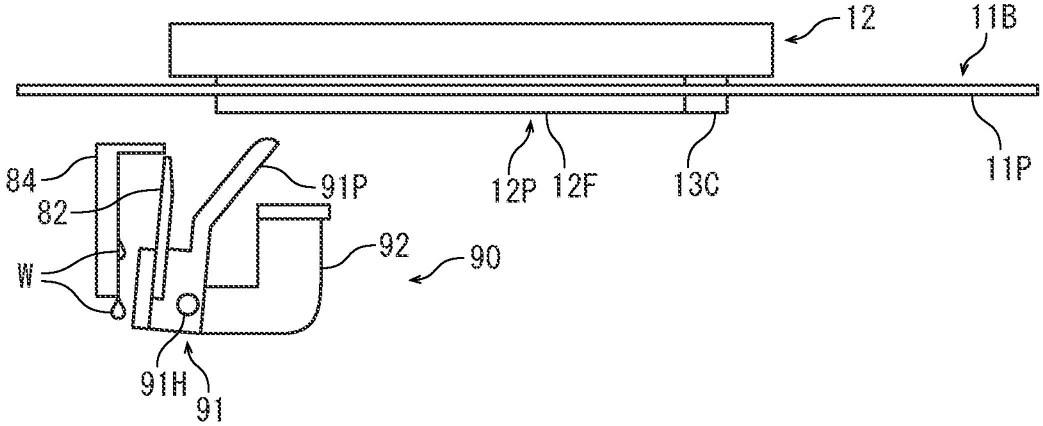
FIG. 25 is a side view schematically showing an operation of the blade unit according to the embodiment of the present disclosure.

Then, the control part 2 operates the cleaning liquid supplying part 13 to inflate the cleaning liquid F from the cleaning liquid supply port 13A of the connecting member 13C (see FIG. 5, FIG. 22), and operates the carriage moving mechanism to move the blade 82 forward (one example of a predetermined traveling direction D) (see FIG. 23). The blade 82 moves while scraping the cleaning liquid F from the cleaning liquid supply port 13A and then scraping the ink i from the nozzle surface 12F. Since the protruding members 91 moves in contact with the parallel surface 11P, there is less variation in the tilt angle of the blade 82, and the blade 82 can be pushed against the nozzle surface 12F with a constant load. Also, since the blade 82 is flexible, a slight deflection occurs when it is pressed against the nozzle surface 12F, but since the biasing member 93 absorbs the excessive load, the blade 82 can be pushed against the nozzle surface 12F with a proper load.

As the blade 82 moves, the ink i is diluted with the cleaning liquid F and falls along the blade 82. The waste liquid W, a mixture of ink i and the cleaning liquid F, flows down along the front and rear surfaces of the blade 82. The waste liquid W that flows down along the rear surface of the blade 82 flows down through the through-holes 91A of the protruding members 91. The waste liquid W fallen from the blade 82 and the protruding members 91 passes through a discharge port (not shown) provided in the recess 81U and falls on the cap 72.

Figure 19:
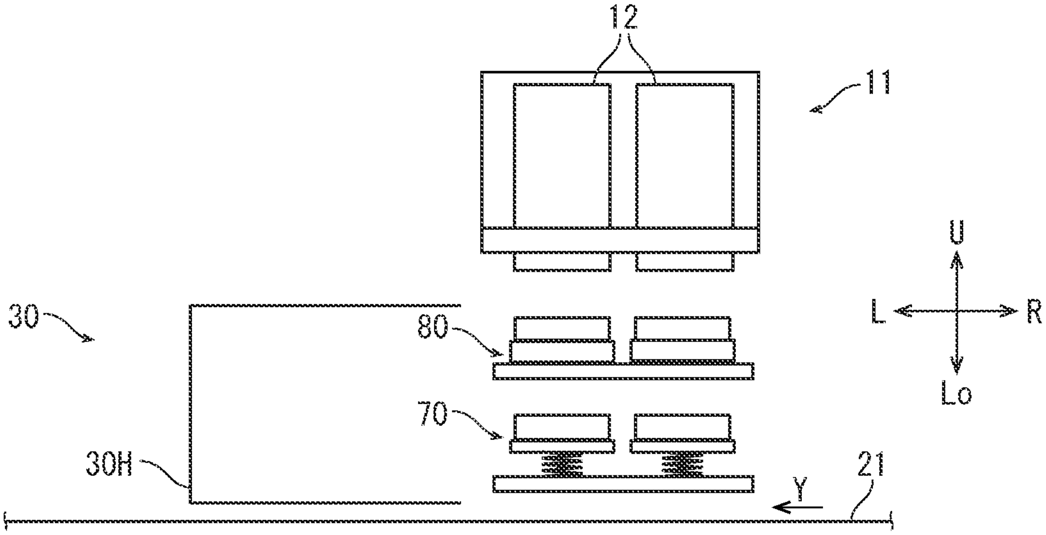
FIG. 19 is a cross-sectional view showing the operation of the maintenance device and the head unit according to the embodiment of the present disclosure.

At the end of wiping, that is, when the blade 82 passes through the front end of the nozzle surface 12F (see FIG. 24), the control part 2 operates the lifting mechanism to lift the head unit 11 to the retracted position (see FIG. 19). At this time, since the head base 11B is also lifted, the protruding members 91 swings in the counterclockwise direction and the tilt of the blade 82 returns to the angle α. In addition, the separation of the blade 82 from the nozzle surface 12F eliminates the deflection deformation of the blade 82. This action releases the waste liquid from the blade toward the receiving member. The waste liquid W received by the receiving member 84 flows down along the inner surface of the receiving member 84, passes through the discharge port (not shown) provided in the recess 81U, and falls to the cap 72.

If the restoration of the tilt of the blade 82 is not performed, the deflection of the blade 82 is suddenly eliminated when the tip of the blade 82 passes through the front end of the nozzle surface 12F, and the waste liquid W is released obliquely upward from the tip of the blade 82, which may collide with the head base 11B and scatter. On the other hand, in the present embodiment, since the restoration of the tilt of the blade 82 is performed in parallel with the elimination of the deflection deformation, the waste liquid W is released forward and received by the receiving member 84, and the scattering of the waste liquid W is suppressed.

Next, the control part 2 operates the wipe moving mechanism to accommodate the wipe unit 80 in the housing 31 (see FIG. 17). Then, the control part 2 operates the lifting mechanism to lower the head unit 11 to the height where the nozzle surface 12F is in contact with the cap 72 (see FIG. 18).

When an image forming operation is performed, the control part 2 operates the lifting mechanism to lift the head unit 11 to the retreating position (see FIG. 17). Then, the control part 2 operates the cap moving mechanism to accommodate the cap unit 70 in the housing 31 (see FIG. 16), and operates the lifting mechanism to lower the head unit 11 to the image forming position (see FIG. 15).

The inkjet recording apparatus 1 according to the present embodiment described above includes the holder 92 which faces the nozzle surface 12F of the inkjet head 12 and moves in the predetermined traveling direction D along the nozzle surface 12F, the blade 82 which is provided in the holder 92 and swung about the shaft 91H intersecting the traveling direction D, and the biasing member 93 which is provided in the holder 92 and biases the blade 82 in the direction of pressing the tip of the blade 82 against the nozzle surface 12F. With this configuration, the blade 82 can be pushed against the nozzle surface 12F with a proper load because the biasing member 93 absorbs excessive load compared with the case where the blade 82 is not swung. In addition, since the biasing member 93 is provided for each blade 82, the load can be optimized for each inkjet head 12 when a plurality of the inkjet heads 12 are provided.

In addition, the inkjet recording apparatus 1 according to the present embodiment includes the protruding member 91 which is provided integrally with the blade 82, protrudes rearward in the traveling direction D than the shaft 91H, and tilts the blade 82 rearward in the traveling direction D by being pushed away to the side of the holder 92 by the parallel surface 11P parallel to the nozzle surface 12F or the nozzle surface 12F. According to this configuration, since the blade 82 tilts rearward when the protruding member 91 is pressed against the nozzle surface 12F or the parallel surface 11P, the blade 82 can be pressed against the nozzle surface 12F with the minimum necessary load. In addition, since the protruding member 91 is moved in contact with the nozzle surface 12F or the parallel surface 11P, there is little variation in the inclination angle of the blade 82 and the blade 82 can be pushed against the nozzle surface 12F with a constant load.

In addition, according to the inkjet recording apparatus 1 according to the present embodiment, the parallel surface 11P is provided outside the nozzle surface 12F in the width direction intersecting the traveling direction D, and the protruding member 91 is in contact with the parallel surface 11P. With this configuration, damage to the nozzle surface 12F can be prevented because the protruding member 91 does not come into contact with the nozzle surface 12F.

In addition, according to the inkjet recording apparatus 1 according to the present embodiment, the protruding member 91 has the through-hole 91A for discharging the liquid flowed down along the blade 82. With this configuration, the waste liquid W containing the ink removed from the nozzle surface 12F can be prevented from remaining and sticking to the protruding member 91. In particular, since the opening of the through-hole 91A into which the liquid W flows is located above the shaft 91H, it is difficult to inhibit the turning motion due to the adhesion of the liquid W near the shaft 91H. In addition, it is difficult for the waste liquid W s passed through the through-hole 91A to hit the shaft 91H. Specifically, the path through which the waste liquid W passed through the through-hole 91A flows and the shaft 91H are separated by the wall part 91C, so that the waste liquid W hardly hits the shaft 91H. The discharge side opening of the through-hole 91A may be arranged below the shaft 91H to prevent the waste liquid W from hitting the shaft 91H.

In addition, the inkjet recording apparatus 1 according to the present embodiment includes the receiving member 84 which is provided in front of the movement end position of the holder 92 in the traveling direction D and receives the liquid released from the blade 82. With this configuration, the scattering of waste liquid W released from the blade 82 can be suppressed.

In addition, the inkjet recording apparatus 1 according to the present embodiment includes the lifting mechanism for lifting and lowering the inkjet head 12 or the holder 92, and the lifting mechanism separates the inkjet head 12 from the holder 92 at the end of wiping of the nozzle surface 12F by the blade 82. According to this configuration, since the blade 82 is rises smoothly at the end of wiping, the waste liquid W adhering to the blade 82 can be flown toward the receiving member 84. In addition, since the waste liquid W remaining on the blade 82 tends to flow downward, it becomes difficult for the liquid to remain on the blade 82.

The above embodiment may be modified as follows.

Although the above embodiment shows an example in which the inkjet head 12 and the holder 92 are separated from each other at the end of wiping, the step between the front end portion of the nozzle surface 12F and the parallel surface 11P may be eliminated by tilting the front portion of the parallel surface 11P of the head base 11B that is forward of the front end of the nozzle surface 12F (not shown). Even with this configuration, since the blade 82 rises smoothly at the end of wiping, the waste liquid W adhering to the blade 82 can flow toward the receiving member 84.

In addition to the configuration of the above embodiment, a roller rotating around an axis parallel to the shaft 91H may be provided (not shown). With this configuration, friction resistance between the protruding member 91 and the parallel surface 11P can be reduced.

The invention claimed is:

1. An inkjet recording apparatus comprising:

a holder which faces a nozzle surface of an inkjet head and moves in a predetermined traveling direction along the nozzle surface;

a blade provided in the holder and swung about a shaft crossing the traveling direction;

a biasing member provided in the holder and biasing the blade in a direction in which a tip end portion of the blade is pressed against the nozzle surface; and a protruding member integrally provided with the blade, protruding rearward from the shaft in the travelling direction, and tilting the blade rearward in the travelling direction by being pushed away by the nozzle surface or a parallel surface parallel to the nozzle surface, wherein the protruding member has a through-hole through which at least a part of liquid flowing down along the blade is passed.

2. The inkjet recording apparatus according to claim 1, wherein the parallel surface is provided outside the nozzle surface in a width direction crossing the travelling direction, and the protruding member is in contact with the parallel surface.

3. The inkjet recording apparatus according to claim 2, wherein the protruding member is moved in contact with the parallel surface when the holder is moved in the travelling direction.

4. The inkjet recording apparatus according to claim 2, wherein the protruding member is provided on both outer sides of the blade in the width direction.

5. The inkjet recording apparatus according to claim 1, comprising:

a receiving member provided in front of a movement end position of the holder in the traveling direction and receives liquid released from the blade.

6. The inkjet recording apparatus according to claim 1, comprising:

a lifting mechanism which lifts and lowers the inkjet head or the holder, wherein the lifting mechanism separates the inkjet head from the holder at an end of wiping of the nozzle surface by the blade.

* * * * *